(12) United States Patent
Kpomblekou-Ademawou

(10) Patent No.: US 8,936,663 B2
(45) Date of Patent: Jan. 20, 2015

(54) RECOVERY OF PHOSPHOROUS FROM POULTRY LITTER

(75) Inventor: Kokoasse Kpomblekou-Ademawou, Auburn, AL (US)

(73) Assignee: Tuskegee University, Tuskegee, AL (US)

( * ) Notice: Subject to any disclaimer, the term of this patent is extended or adjusted under 35 U.S.C. 154(b) by 160 days.

(21) Appl. No.: 13/302,286

(22) Filed: Nov. 22, 2011

(65) Prior Publication Data

US 2013/0125599 A1    May 23, 2013

(51) Int. Cl.
*C05F 3/00* (2006.01)
*C05D 1/02* (2006.01)

(52) U.S. Cl.
CPC ...................................... *C05D 1/02* (2013.01)
USPC .................................................. 71/21; 71/22

(58) Field of Classification Search
CPC ...................................................... C05D 1/02
USPC ........................................................ 71/11–30
See application file for complete search history.

(56) References Cited

U.S. PATENT DOCUMENTS

| 7,814,848 B2 * | 10/2010 | Pote et al. ...................... 111/130 |
| 2009/0193863 A1 * | 8/2009 | Szogi et al. ....................... 71/21 |
| 2013/0125599 A1 * | 5/2013 | Kpomblekou-Ademawou 71/21 |

OTHER PUBLICATIONS

US Department of Agriculture, "Mining Poultry Manure for Phosphorus," Science Daily, Mar. 10, 2008, http://www.sciencedaily.com/releases/2008/03/080307081030.htm.

* cited by examiner

*Primary Examiner* — Jennifer A Smith
(74) *Attorney, Agent, or Firm* — Hogan Lovells US LLP

(57) ABSTRACT

A chemical extractant selected from solutions of $K_2SO_4$ and/or $Na_2SO_4$ can be used by contacting with untreated broiler litter to selectively and efficiently remove phosphorous from the broiler litter. The broiler litter and extractant solution mixture, after a suitable time, can be separated, such as by filtration. The resulting treated broiler litter is thus significantly lower in P content without being lower by an undesirable amount in more preferred minerals. The treated litter so obtained is suitable for crop soil augmentation. Further, phosphorous can be thereafter precipitated in the form of phytic acid. Since the precipitate is high in mineral content, it can be used for other purposes (e.g., plant food, etc.).

20 Claims, 17 Drawing Sheets

Plant available P and citrate insoluble-P content of broiler samples before and after extraction[†]

| Sample no. | Before extraction | | | After extraction with extractants as specified[‡] | | | | | | | | |
| --- | --- | --- | --- | --- | --- | --- | --- | --- | --- | --- | --- | --- |
| | | | | Deionized water | | | Na$_2$SO$_4$ | | | K$_2$SO$_4$ | | |
| | WSP | CSP | CISP | WSP | CSP | CISP | WSP | CSP | CISP | WSP | CSP | CISP |
| | | | | | | g kg$^{-1}$ | | | | | | |
| 1 | 6.23 | 0.20 | 15.5 | 5.82 | 0.19 | 11.9 | 2.02 | 0.24 | 1.78 | 2.02 | 0.21 | 1.28 |
| 2 | 5.62 | 0.21 | 13.5 | 5.08 | 0.14 | 9.68 | 2.06 | 0.19 | 1.65 | 2.17 | 0.20 | 0.61 |
| 3 | 6.01 | 0.16 | 14.7 | 5.49 | 0.17 | 12.4 | 1.99 | 0.24 | 1.58 | 2.10 | 0.20 | 0.96 |
| 4 | 9.58 | 0.37 | 20.8 | 7.97 | 0.32 | 11.8 | 2.78 | 0.28 | 2.59 | 2.87 | 0.28 | 1.67 |
| Mean | 6.86a | 0.24a | 16.1a | 6.09b | 0.21c | 11.3b | 2.21d | 0.24a | 1.90c | 2.29c | 0.22b | 1.13d |
| Median | 6.12 | 0.21 | 15.1 | 5.66 | 0.18 | 11.9 | 2.04 | 0.24 | 1.72 | 2.14 | 0.21 | 1.12 |

[†]Means followed by the same lower case letter for the same P form across a row are not significantly different at the 0.05 probability level using the Duncan multiple range comparison test.
[‡]Values are quadruplet means of the samples WSP = water soluble-P
CSP = citrate soluble-P
CISP = citrate insoluble-P

FIG. 3

Estimated Total Phytic Acid-P Present in the Broiler Litter Samples

| Samp. No. | Total P of original broiler litter | Total P remaining in residue after extraction with extractant specified | | Total P of supernatant after extraction with extractant specified | | Estimated total phytic acid-P content of samples by extractant specified[†] | |
|---|---|---|---|---|---|---|---|
| | | $Na_2SO_4$ | $K_2SO_4$ | $Na_2SO_4$ | $K_2SO_4$ | $Na_2SO_4$ | $K_2SO_4$ |
| | ←──────────────────────────────────────── g/kg ────────────────────────────────────────→ | | | | | | |
| 1 | 21.9 | 4.04 | 3.50 | 0.77 | 0.54 | 17.1 (78.0) | 17.9 (81.6) |
| 2 | 19.3 | 3.90 | 2.98 | 0.71 | 0.53 | 14.7 (76.1) | 15.8 (81.8) |
| 3 | 20.9 | 3.81 | 3.26 | 0.76 | 0.63 | 16.3 (78.1) | 17.0 (81.4) |
| 4 | 30.8 | 5.65 | 4.82 | 1.30 | 0.97 | 23.9 (77.4) | 25.0 (81.2) |
| Mean | 23.2 | 4.35 | 3.64 | 0.89 | 0.67 | 18.0 (77.4) | 18.9 (81.4) |
| Median | 21.4 | 3.97 | 3.38 | 0.77 | 0.59 | 16.7 (77.9) | 17.4 (81.4) |

[†] The estimated phytic acid-P content of the broiler litter samples was obtained by difference between the total P content of the sample and the sum of total P remaining in the broiler litter residue following extraction and the P content of the supernatant. Numbers in parentheses represent the estimated % phytic acid-P in the litter.

FIG. 5

Selected Properties of Original Broiler Litter Samples

| Sample no: | Bedding Material | Litter age Month | Moisture | pH | Organic C | C/N |
|---|---|---|---|---|---|---|
| | | | ——— % ——— | | —— g kg$^{-1}$ —— | |
| 1 | Pine Shavings | 9 | 11.9 | 8.1 | 388 | 8.55 |
| 2 | Sawdust | 6 | 11.0 | 7.9 | 361 | 9.45 |
| 3 | Pine Shavings and Sawdust | 6 | 15.4 | 7.9 | 367 | 7.72 |
| 4 | Peanut hulls | 9 | 28.5 | 8.6 | 351 | 7.59 |

FIG. 8A

Total C, N, and S Contents in Broiler Litter Samples Before and After Extraction[†]

| | Before extraction | | | After extraction with extractant as specified[‡] | | | | | | | | |
| | | | | Deionized water | | | Na$_2$SO$_4$ | | | K$_2$SO$_4$ | | |
| Sample no: | C | N | S | C | N | S | C | N | S | C | N | S |
| --- | --- | --- | --- | --- | --- | --- | --- | --- | --- | --- | --- | --- |
| | | | | | | g kg$^{-1}$ | | | | | | |
| 1 | 381 | 43.1 | 8.19 | 359 | 27.8 | 4.10 | 296 | 23.9 | 62.7 | 256 | 22.2 | 70.7 |
| 2 | 369 | 37.1 | 6.43 | 348 | 20.1 | 2.90 | 291 | 18.2 | 67.1 | 265 | 16.8 | 67.1 |
| 3 | 369 | 42.2 | 6.05 | 356 | 26.1 | 3.10 | 295 | 24.4 | 65.3 | 257 | 22.0 | 72.7 |
| 4 | 323 | 35.0 | 7.31 | 299 | 27.0 | 3.30 | 270 | 22.4 | 66.6 | 235 | 19.9 | 71.6 |
| Mean | 361a | 39.4a | 7.00c | 341b | 25.3b | 3.35d | 288c | 22.2c | 65.4b | 253d | 20.2d | 70.5a |
| Median | 369 | 39.7 | 6.87 | 352 | 26.6 | 3.20 | 293 | 23.2 | 66.0 | 257 | 21.0 | 71.2 |

†Means followed by the same lower case letter for the same element across a row are not significantly different at the 0.05 probability level using the Duncan multiple range comparison test.
‡Values are quadruplet means of the samples

FIG. 8B

Total C, N, and S Released in Supernatants Obtained After Extraction[†]

| Sample no: | Extractant as specified | | | | | | | | |
|---|---|---|---|---|---|---|---|---|---|
| | Deionized water | | | $Na_2SO_4$ | | | $K_2SO_4$ | | |
| | C | N | S | C | N | S | C | N | S |
| | g/kg | | | | | | | | |
| 1 | 1.26 | 2.68 | 1.22 | 1.48 | 1.97 | 6.77 | 1.20 | 3.19 | 8.37 |
| 2 | 1.29 | 2.17 | 0.58 | 1.18 | 1.98 | 6.59 | 0.86 | 3.28 | 7.96 |
| 3 | 1.10 | 2.28 | 0.29 | 1.03 | 1.60 | 10.6 | 1.51 | 3.06 | 7.67 |
| 4 | 0.74 | 2.28 | 0.35 | 0.92 | 2.28 | 9.27 | 0.68 | 2.60 | 8.61 |
| Mean | 1.10a | 2.35b | 0.61b | 1.15a | 1.96c | 8.31a | 1.06a | 3.03a | 8.15a |
| Median | 1.18 | 2.28 | 0.47 | 1.11 | 1.98 | 8.02 | 1.03 | 3.13 | 8.17 |

[†]Means followed by the same lower case letter across a row are not significantly different at the 0.05 probability level using the Duncan multiple range comparison test.

FIG. 9

Total C, N, and S Released in Concentrates Following Extraction of Broiler Litter[†]

| Sample no: | Extractant as specified | | | | | | | | |
| --- | --- | --- | --- | --- | --- | --- | --- | --- | --- |
| | water | | | Na$_2$SO$_4$ | | | K$_2$SO$_4$ | | |
| | C | N | S | C | N | S | C | N | S |
| | g/kg | | | | | | | | |
| 1 | 8.62 | 4.74 | 1.26 | 9.22 | 4.93 | 38.3 | 6.34 | 4.01 | 15.4 |
| 2 | 8.21 | 4.65 | 0.81 | 7.08 | 4.84 | 47.9 | 4.60 | 4.00 | 17.5 |
| 3 | 8.19 | 5.16 | 0.69 | 6.27 | 4.16 | 34.4 | 6.04 | 4.21 | 15.9 |
| 4 | 5.59 | 4.10 | 0.55 | 3.54 | 3.76 | 34.0 | 3.64 | 3.87 | 16.9 |
| Mean | 7.65a | 4.66a | 0.83c | 6.53b | 4.42a | 38.7a | 5.16c | 4.02b | 16.4b |
| Median | 8.20 | 4.70 | 0.75 | 6.68 | 4.50 | 36.4 | 5.32 | 4.01 | 16.4 |

[†]Means followed by the same lower case letter for the same element across a row are not significantly different at the 0.05 probability level using the Duncan multiple range comparison test.

FIG. 10

Total C, N, and S Contents of the Precipitated Pellet Following Extraction of Broiler Litter[†]

| Sample no: | Extractant as specified | | | | | |
|---|---|---|---|---|---|---|
| | $Na_2SO_4$ | | | $K_2SO_4$ | | |
| | C | N | S | C | N | S |
| | | | g kg$^{-1}$ | | | |
| 1 | 89.3 | 5.76 | 42.1 | 60.4 | 7.30 | 20.7 |
| 2 | 146 | 8.06 | 68.7 | 70.4 | 7.37 | 20.3 |
| 3 | 83.8 | 4.82 | 32.4 | 66.0 | 7.78 | 13.9 |
| 4 | 54.9 | 2.66 | 20.4 | 65.3 | 6.68 | 20.4 |
| Mean | 93.5a | 5.33b | 40.9a | 65.5b | 7.28a | 18.8b |
| Median | 86.6 | 5.29 | 37.3 | 65.7 | 7.34 | 20.4 |

[†]Means followed by the same lower case letter for the same element across a row are not significantly different at the 0.05 probability level using the Duncan multiple range comparison test.

FIG. 11

Inorganic Nitrogen Content of Broiler Litter Samples Before and After Extraction†

| Sample no: | Before extraction | | After extraction with extractant as specified | | | | | |
| --- | --- | --- | --- | --- | --- | --- | --- | --- |
| | | | Deionized water | | Na$_2$SO$_4$ | | K$_2$SO$_4$ | |
| | NH$_4^+$ - N | NO$_x$ - N | NH$_4^+$ - N | NO$_x$ - N | NH$_4^+$ - N | NO$_x$ - N | NH$_4^+$ - N | NO$_x$ - N |
| | | | | g kg$^{-1}$ | | | | |
| 1 | 2.70 | 0.68 | 0.43 | 0.01 | 0.84 | 0.08 | 0.18 | 0.03 |
| 2 | 2.33 | 2.16 | 0.31 | 0.07 | 0.69 | 0.17 | 0.25 | 0.15 |
| 3 | 2.38 | 2.73 | 0.41 | 0.02 | 0.67 | 0.45 | 0.22 | 0.25 |
| 4 | 2.87 | 1.67 | 0.58 | 0.01 | 0.81 | 0.25 | 0.39 | 0.12 |
| Mean | 2.57a | 1.81a | 0.43c | 0.03d | 0.75b | 0.24b | 0.26d | 0.14c |
| Median | 2.54 | 1.92 | 0.42 | 0.02 | 0.75 | 0.21 | 0.24 | 0.14 |

†Means followed by the same lower case letter for the same element across a row are not significantly different at the 0.05 probability level using the Duncan multiple range comparison test.

FIG. 12

Inorganic Nitrogen Released in Filtrates Following Extraction of Broiler Litter Samples[†]

| Sample no: | Deionized water | | Extractant as specified[‡] Na$_2$SO$_4$ | | K$_2$SO$_4$ | |
|---|---|---|---|---|---|---|
| | NH$_4^+$ - N | NO$_x$ - N | NH$_4^+$ - N | NO$_x$ - N | NH$_4^+$ - N | NO$_x$ - N |
| | g kg$^{-1}$ | | | | | |
| 1 | 2.27 | 0.67 | 1.86 | 0.59 | 2.53 | 0.65 |
| 2 | 2.02 | 2.09 | 1.63 | 1.99 | 2.09 | 2.02 |
| 3 | 1.96 | 2.71 | 1.72 | 2.27 | 2.17 | 2.48 |
| 4 | 2.30 | 1.66 | 2.07 | 1.41 | 2.49 | 1.55 |
| Mean | 2.14a | 1.78a | 1.82b | 1.57a | 2.32a | 1.68a |
| Median | 2.15 | 1.88 | 1.79 | 1.70 | 2.33 | 1.79 |

[†]Means followed by the same lower case letter for the same ion across a row are not significantly different at the 0.05 probability level using the Duncan multiple range comparison test
[‡]Value obtained by subtracting the inorganic nitrogen of the residue from that of the original broiler litter

FIG. 13

Inorganic Nitrogen Released in Supernatants Following Precipitation of Phytic Acid in Broiler Litter[†]

| Sample no: | Extractant as specified | | | | | |
|---|---|---|---|---|---|---|
| | Deionized water | | Na$_2$SO$_4$ | | K$_2$SO$_4$ | |
| | NH$_4^+$ - N | NO$_x$ - N | NH$_4^+$ - N | NO$_x$ - N | NH$_4^+$ - N | NO$_x$ - N |
| | g/kg | | | | | |
| 1 | 3.29 | 0.63 | 3.27 | 0.60 | 1.80 | 0.47 |
| 2 | 2.84 | 1.88 | 2.81 | 1.85 | 2.48 | 1.50 |
| 3 | 2.80 | 3.11 | 2.78 | 3.08 | 2.22 | 2.46 |
| 4 | 5.04 | 1.88 | 5.02 | 1.85 | 3.87 | 1.29 |
| Mean | 3.49a | 1.88a | 3.47a | 1.85a | 2.59b | 1.43b |
| Median | 3.07 | 1.88 | 3.04 | 1.85 | 2.35 | 1.40 |

[†]Means followed by the same lower case letter for the same ion across a row are not significantly different at the 0.05 probability level using the Duncan multiple range comparison test.

FIG. 14

Inorganic Nitrogen Released in the Concentrates Following Extraction of the Broiler Litter Samples[†]

| | Extractant as specified[‡] | | | | | |
|---|---|---|---|---|---|---|
| | Deionized water | | $Na_2SO_4$ | | $K_2SO_4$ | |
| Sample no: | $NH_4^+$ - N | $NO_x$ - N | $NH_4^+$ - N | $NO_x$ - N | $NH_4^+$ - N | $NO_x$ - N |
| | g/kg | | | | | |
| 1 | 0.31 | 0.04 | 0.68 | 0.04 | 0.37 | 0.09 |
| 2 | 0.22 | 0.10 | 0.58 | 0.23 | 0.30 | 0.17 |
| 3 | 0.33 | 0.17 | 0.71 | 0.30 | 0.43 | 0.40 |
| 4 | 0.34 | 0.12 | 0.82 | 0.26 | 0.53 | 0.23 |
| Mean | 0.30c | 0.11c | 0.70a | 0.21b | 0.41b | 0.22a |
| Median | 0.32 | 0.11 | 0.70 | 0.25 | 0.40 | 0.20 |

[†]Means followed by the same lower case letter for the same ion across a row are not significantly different at the 0.05 probability level using the Duncan multiple range comparison test
[‡]The volume of the filtrate was reduced to 30% using a Büchi Rotavapor (Flawil, Switzerland)

FIG. 15

RECOVERY OF PHOSPHOROUS FROM POULTRY LITTER

FIELD OF THE INVENTION

The present invention relates to the treatment of livestock waste products. More particularly, the present invention relates to methods for scalable treatment of poultry litter to remove excess quantities of phosphorous, recover minerals, and produce reusable materials therefrom.

BACKGROUND OF THE INVENTION

A broiler is a type of chicken raised specifically for meat production. Broilers comprise breeds that were specially bred for large scale, efficient meat production and growth in comparison to egg-producing breeds or traditional dual-purpose breeds. Broilers typically have very fast growth rates, a high feed conversion ratio, and low levels of activity, reaching harvest weight in about five weeks.

Annual broiler production in the United States has grown at a significant rate over the past four decades. In 2007, it was reported that the number of broiler pounds rose from 8 billion in 1966 to 49 billion in 2006. The increase in poultry production, particularly broilers, has been attributed to an increase in number of large-scale broiler houses and feeding operations. One measure states that in 2003 alone, over 32 billion broilers were produced by four companies in the United States, which companies run their own conglomerate of many very large scale industrial farms. Further, the U.S. broiler industry is mainly concentrated in the southeastern states, including Georgia, Arkansas, Alabama, Mississippi, and North Carolina, producing over 85% of the total pounds of broiler meat in the U.S.

Large commercial broiler operations generate enormous quantities of waste annually, and the management of this waste is largely unregulated. This waste, termed "broiler litter" in the industry, is composed of a mixture of bedding materials (straw or wood shavings), chicken excreta, feathers, and spilled feed. Its high organic carbon and nutrient contents along with its believed positive effects on soil have encouraged farmers to use it on agricultural soils. Many broiler producers simply "recycle" the waste by mixing with top soil in crop fields or the like. However, a single broiler bird generates approximately 1.5 kg of litter in a ten-week life cycle. The bulkiness of the waste generated and its high transportation costs have been a predicament to producers who would like to move the waste to surrounding counties and other states because they cannot use all of it on their own farms.

All told, a large majority of the domestic amount of broiler waste is applied directly to the land without any pretreatment. This can have an undesirable effect on the soil or water run off over time. In particular, broiler litter contains a high concentration of inorganic phosphorous ("P") that originates from phytic acid and its phytate salts present in broiler feed. Broilers are typically fed corn and soybean blend diets fortified with vitamins and minerals. Corn seeds contain P mainly in phytate form. In this form, P is generally not bioavailable to broilers because they lack the digestive enzyme, phytase, required to separate P from the phytate molecule. Because phytate from these grains is unavailable for absorption, the unabsorbed phytate passes through the gastrointestinal tract of birds, thus elevating the P content of the manure. Continuous application of broiler litter to cropland or pastureland therefore may lead to accumulation of P in topsoil over time.

One recent investigation reported that over application of broiler litter results in increased concentrations of P in the soil solution and P enrichment of surface waters (see Toor et al., *Advances in Agronomy,* 89:1-72, 2006). In addition, when poultry waste is applied to crop field to provide nitrogen ("N") requirements, this results in a net P balance in soil because more P is applied than is typically removed by harvested crops (see Sharpley, *Poul. Sci.,* 78:660-673, 1999). Consequently, application of poultry litter can lead to a build-up of P in soils because manure N/P ratios are lower than crop N/P requirement ratios.

Run off of P from these over fertilized soils to nearby water bodies has also been established to cause eutrophication of lakes and streams (see Paudel et al., *Waste Management,* 25:1083-1088, 2005). In 2002, the US Environmental Protection Agency (USEPA) set permissible maximum total P concentrations for lakes, reservoirs, rivers, and streams. Although concentrated animal feeding operations have been regulated for more than 25 years, continued impairment of waters has led the Federal government to scrutinize such operations as potential sources of pollutants more scrupulously. Thus, there is a need to develop methods that would reduce P content of broiler litter before its application to agricultural land in order to avoid a long-term build-up of P in soil.

One of the approaches used to regulate available P content of broiler litter is the use of alum $(Al_2(SO_4)_3$—aluminum sulfate). Alum has been used extensively in poultry houses to reduce P availability in the poultry litter. When mixed with broiler litter, aluminum sulfate reacts with moisture in the litter to reduce ammonia volatilization and tie up soluble P precipitate it as $AlPO_4$, which then can be disposed of separately. While the use of alum has reduced available P, it has increased the total and water-soluble aluminum concentration in the litter (see Sims et al., *J. Environ. Qual.,* 27:277-293, 2002). In addition, alum is relatively expensive and its use has had limited success at controlling soluble P levels.

Another approach utilized in the poultry industry is addition of the phytase enzyme to broiler diets before pelleting. Such phytase addition can result in a 15% to 25% decrease in total P in the litter compared with conventional diets. This approach, however, is also not ideal because the pelleting process usually denatures some of the phytase, making it less effective. Heat-stable enzymes able to withstand the pelleting process are being developed, but they are very expensive and cost prohibitive. The overall P decrease achieved may not be high enough to justify the cost.

Other areas that have encountered the problem of P removal include wastewater treatment and swine waste disposal. For wastewater treatment, chemical precipitation has been employed, which is a physicochemical process consisting of the addition of a divalent or trivalent cation salt to wastewater to cause precipitation of an insoluble metal-phosphate molecule that is thereafter settled out by sedimentation. The most suitable metals are iron and aluminum, added as chlorides or sulfates, and generally large scale chemical precipitation is performed using low-cost sorbents such as alum sludge, and red mud. Sometimes, the process is aided by addition of anionic polymers that assist in solid separation. In other instances, calcitic lime is used to precipitate calcium phosphate. Because P precipitation is pH dependent, however, such methods are not universally effective in providing high P removal rates. With respect to livestock waste in particular, Meers et al. (*Water, Air, and Soil Pollution,* 169:317-330, 2006) have suggested that the use of flocculants (e.g., $FeCl_3$, $FeCl_2$, $FeClSO_4$, poly-aluminum chloride) followed by adsorption or precipitation of substrates can be efficient in reducing P levels of liquid pig manure. In the swine industry, P removal has also been achieved by the precipitation of P as a part of a mineral known as struvite, which also contains Mg and $NH_4^+$. This method reportedly has achieved reductions of 90% of soluble P concentrations in 140,000 liters (~37,000 gallons) of swine slurry. Others have tried to treat swine waste with chemical additives at dosage levels of 1,500 $mgL^{-1}$ (5.4 mM $Fe^{+3}$) of ferric chloride or aluminum sulfate, and reported successful removal of 86% and 76% of P, respectively (see Ndegwa et al., *J. Envir. Engrg.*, 127:1111-1115, 2001). None, however, have approached the problem of how to successfully remove the P from solid poultry litter.

Thus, there remains a need in the art for methods to reduce the amount of P contained in poultry litter before its application to land.

SUMMARY OF THE INVENTION

In light of the above needs, it is an object of one or mode embodiments of the present invention to provide methods for treating broiler litter.

Furthermore, it is an object of one or more embodiments of the present invention to provide methods for removing phosphorous from broiler litter while maintaining its general suitability for crop soil augmentation.

Additionally, it is an object of one or more embodiments of the present invention to provide methods for recovering phosphorous and other minerals from poultry litter.

The various embodiments of the present invention achieve these and other objects via the use of a chemical extractant selected from solutions of $K_2SO_4$ and/or $Na_2SO_4$, which extractants are contacted with untreated broiler litter to selectively and efficiently remove P from the broiler litter. In various embodiments of the invention, the contacting of the broiler litter with the extractant solution(s) can be done in any suitable fashion, however emersion of the litter in solution and agitating is preferred. Thereafter, the broiler litter and extractant solution mixture, after a suitable time, is separated, such as by filtration. The resulting treated broiler litter is thus significantly lower in P content without being lower by an undesirable amount in more preferred minerals. The treated litter so obtained is suitable for crop soil augmentation.

Further, embodiments of the invention further include precipitating P in the form of phytic acid from liquid filtrate obtained after the mixture of broiler litter and extractant solution is separated. The precipitate is high in mineral content, and P in particular, and thus can be used for other purposes (such as in formulations of plant food, etc.).

Applicants confirmed applicability of the invention with four different broiler litter samples of varying bedding materials (peanut hulls, pine shavings, sawdust, or pine shavings and sawdust mixture), pH, litter age, and mineral ratios. Broiler litter residues obtained following extraction with $Na_2SO_4$ or $K_2SO_4$ according to various methods of the present invention were reduced from on average 23.2 g P per kg litter in the original broiler litter to 4.35 g/kg and 3.64 g/kg, respectively. The amount of extraction achieved using either agent was found to be significantly higher than extraction using deionized water alone. Further, the methods of the present invention also can reduce N content from on average 39.4 g N per kg poultry litter to on average 22.2 g/kg for $Na_2SO_4$ and 20.2 g/kg for $K_2SO_4$, in comparison to 25.3 g/kg for deionized water.

The low P content and the high N content of the broiler litter residue obtained following extraction demonstrated that the extractants used were very selective in removing P from the analytes. Thus, the broiler litter residue produced in methods of the present invention remains suitable for application to crop soil for mineral augmentation. The methods of the present invention also permit successful recovery of P. Applicants experiments found that total and inorganic P in supernatants obtained from precipitation of phytic acid in filtrate obtained from extraction were low.

One particular preferred embodiment of the invention comprises a method for removing excess phosphorous from a poultry litter rich in phosphorous content. The method includes the steps of contacting an amount of broiler litter with an extractant solution where the extractant solution contains a suitable amount of at least one extractant agent selected from the group consisting of $Na_2SO_4$ and $K_2SO_4$. Thereafter, leaving the amount of broiler litter in contact with the extractant solution for an amount of time sufficient to allow a desired amount of phosphorous to be removed from the broiler litter, and then separating the amount of broiler litter and the extractant solution to obtain phosphorous-depleted broiler litter.

Additional embodiments of the invention include a method for disposing of poultry litter rich in phosphorous content. This method comprises removing a desired amount of phosphorous from an amount of said phosphorous-rich poultry litter utilizing the method described above, and mixing the phosphorous-depleted poultry litter obtained with crop soil.

Further, embodiments of the invention also include a method for augmenting crop soil. This method includes mixing crop soil with a phosphorous-depleted poultry litter obtained from the method for removing.

The various embodiments of the invention having thus been generally described, several illustrative embodiments will hereafter be discussed with particular reference to several attached drawings and in view of various experimental examples.

BRIEF DESCRIPTION OF THE DRAWINGS

FIG. 3 depicts a table that reports the amounts of the various forms of P in the original broiler litter samples and in the treated residues after extraction as obtained in various experiments as described herein.

FIG. 5 is a table that reports the estimated amounts of total phytic acid content of various samples tested utilized and produced in the various experiments as described herein.

FIG. 8A is a table that reports the known typical properties of the four original broiler litter samples used in the various experiments herein, and FIG. 8B is a table that reports the average total organic carbon, nitrogen, and sulfur contents of the broiler litter samples before and after extraction obtained from certain experiments described herein.

FIG. 9 is a table that reports the average total organic carbon, nitrogen, and sulfur contents of supernatants obtained from certain experiments described herein.

FIG. 10 is a table that reports the average total organic carbon, nitrogen, and sulfur in the concentrates obtained from certain experiments described herein.

FIG. 11 is a table that reports the average total organic carbon, nitrogen, and sulfur in the precipitate pellets obtained from certain experiments described herein.

FIG. 12 is a table that reports the average total inorganic nitrogen components of the original and residue broiler litter samples obtained from certain experiments described herein.

FIG. 13 is a table that reports the average total inorganic nitrogen components of filtrates obtained from certain experiments described herein.

FIG. 14 is a table that reports the average total inorganic nitrogen components of supernatants obtained from certain experiments described herein.

FIG. 15 is a table that reports the average total inorganic nitrogen components of concentrates obtained from certain experiments described herein.

DETAILED DESCRIPTION OF THE PREFERRED EMBODIMENTS

In the various experiments and examples below, the term "broiler litter residue" refers to the solid residue obtained after the original broiler litter was equilibrated with deionized water or extractants according to the present invention.

In the various experiments and examples below, the term "filtrate" refers to the liquid obtained after the original broiler litter was equilibrated with the extracting solutions and then filtered.

In the various experiments and examples below, the term "concentrate" refers to the filtrate that was concentrated through evaporation of excess water.

In the various experiments and examples below, the term "original broiler litter" refers to broiler litter that has not been subjected to any chemical treatment.

In the various experiments and examples below, the term "pellet" refers to the solid precipitate contains P, mostly in the form of phytic acid.

In the various experiments and examples below, the term "supernatant" refers to the liquid filtrate obtained after P has been precipitated, such as by centrifugation.

Figure 1A:
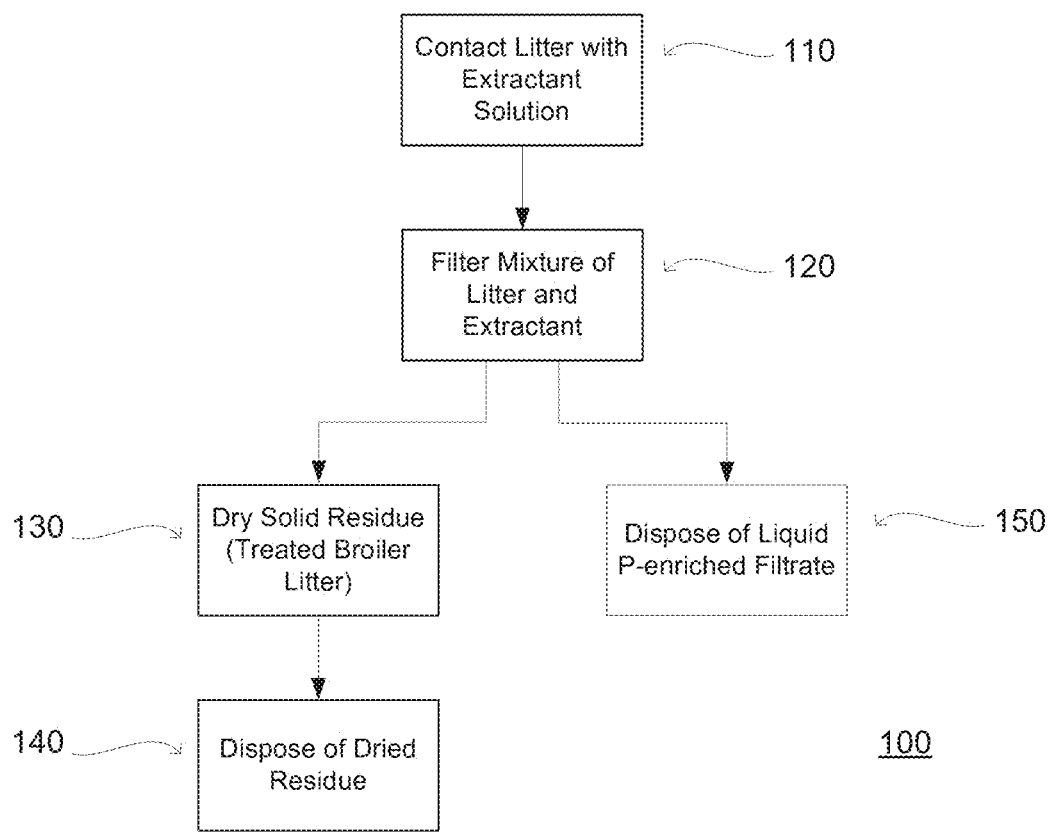
FIG. 1A is a process flow diagram summarizing the various steps in a preferred method according to the present invention.

A process flow diagram summarizing the various steps in a preferred phosphorous removal method 100 according to the present invention is presented in FIG. 1A. As shown in FIG. 1A, method 100 generally begins with a step 110 of contacting the original broiler litter with an extractant solution. Preferably, this entails immersing an amount of original broiler litter in an extracting solution and mixing for sufficient time to allow the extractant solution to soak into the broiler litter. At this time, the reagent, whether $Na_2SO_4$, $K_2SO_4$, or a mixture thereof, will begin to react with the P in the broiler litter.

Next, at step 120, the mixture of broiler litter and extractant solution is filtered to separate the solid, P-depleted broiler litter residue from the liquid, P-enriched filtrate. This filtration step can be accomplished by any known means, including filter paper, meshes, sieves, belt filters, centrifugation, and the like.

The broiler litter residue is thereafter dried at step 130 and this solid is disposed of in some manner at step 140, such as by applying it to crop soil as a fertilizer or other such additive. In this manner, the broiler litter solids can be disposed of relatively cheaply while the crop soil can be augmented with both N and P without causing unwanted build-up of P concentrations.

The liquid filtrate obtained from filtering step 120 is disposed of at step 150. Optionally, this disposal can include precipitating the P (such as in the form of phytic acid or phosphate salts) and disposing of (or reusing) this solid precipitate in an environmentally safe manner. Supernatant obtained in this fashion would likewise be disposed of in an environmentally safe manner.

The method 100 as depicted in FIG. 1A is the very basic step of method of the invention, and thus various alterations can be made without departing from the spirit and scope of the invention. For example, the original broiler litter optionally could be contacted with extracting solutions multiple times. This could include contacting it with a first extractant solution containing a first reagent, filtering, and then contacting the filtered solids thereafter with a second extractant solution containing a different second reagent, and then filtering again. In this manner, it may be possible to maximize the extraction of P without undesirably altering the mineral balance in the treated broiler litter residue and thus maximizing its potential for use as a soil augment for crop growth Likewise, prior to contacting with the extractant solutions, the original broiler litter optionally could be pretreated in some fashion to maximize the effectiveness of the liquid extraction step. This could include, for example, physical processing, such as by grinding, heating, or the like, the original broiler litter to improve the efficiency of the subsequent contacting step.

To verify the effectiveness of the methods of the present invention in the removal of P from poultry litter, Applicants conducted various laboratory experiments using four broiler litter samples of varying bedding materials (peanut hulls, pine shavings, sawdust and pine shavings mixed, and sawdust), pH, litter age, and C/N ratios. Applicant performed various experiments according to the experimental procedure graphically outlined in FIG. 1B in parallel using each of the four original broiler litter samples as starting test materials and exposing samples thereof to an extraction process using alternatively a 10% $Na_2SO_4$ aqueous extractant solution (prepared in 0.4 M HCl), a 10% $K_2SO_4$ aqueous extractant solution (prepared in 0.4 M HCl), and deionized water as a third (control) extractant solution. The process was repeated making certain that multiple trials were performed covering each combination of the four original poultry litter samples with each of the three test extractant solutions. The properties of the various original broiler litter samples and their respective residues, filtrates, precipitates, and supernatants were measured such that Applicants could compare the relative effectiveness of the extractants. The average properties of these four original broiler litter samples are summarized briefly in the table provided as FIG. 2.

Figure 1B:
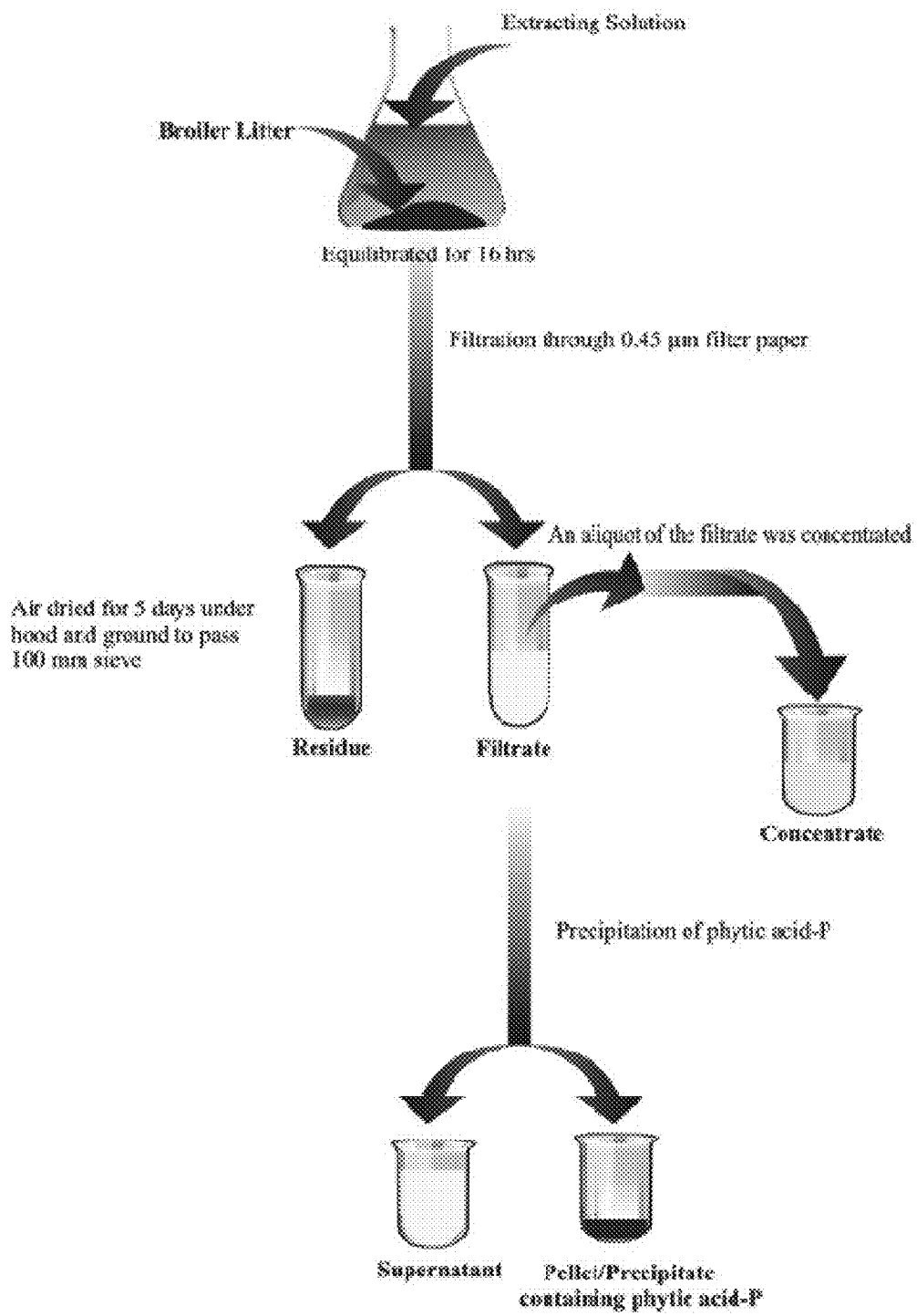
FIG. 1B is a schematic flow diagram summarizing the experimental laboratory process utilized in various ones of the experiments as described herein.

Generally, as depicted in FIG. 1B, for each combination of poultry litter type and extractant type, quadruplet samples of the selected original broiler litter were immersed in the selected test extractant solution and equilibrated for 16 hours. The mixtures were then each filtered using 0.45 mm filter paper to separate the solid (presumably P-depleted) residue from the liquid (presumably P-enriched) filtrate. A small aliquot of each filtrate so obtained was concentrated and saved for analysis (as described further below), and the remainder of the filtrate was acidified and heat treated to precipitate P-containing phytic acid. This precipitation formed a solid "pellet" precipitate and a supernatant solution, which were both retained for analysis (as described further below). The specific of each step conducted during these experiments will now be described.

To begin the experiments as generally depicted and summarized in the schematic flow diagram of FIG. 1B, the original broiler litter samples were subjected to different ones of the three phosphorus extracting solutions in a completely randomized design and designated as sample nos. 1, 2, 3, and 4. During the initial phosphorus extraction step, a 25 g (<0.5 mm) sample of original broiler litter from each of samples nos. 1, 2, 3, or 4 was weighed into a 1 L glass beaker and equilibrated with 500 mL of deionized water, $Na_2SO_4$ extractant solution, or $K_2SO_4$ extractant solution for 16 hours at room temperature on a Bel-art magnetic stirrer (Pequannock, N.J.). The beaker and its contents were stored in a refrigerator and a portion of the mixture was centrifuged using a Jouan C. R 4.22 M4 rotor (Winchester, Va.) for ten minutes at 4500 rpm at 4° C. The supernatant collected was filtered through a membrane filter (0.45 μm, Micron Separations, Inc. Westboro, Mass.) and the filtrate stored in a 500 mL LDPE bottle until used.

The residue from the filtration was air-dried for five days under a hood, then placed in an incubator-model 13200 (Boekel Industries, Feasterville, Philadelphia) at 40° C. for two days to remove excess moisture. The residue was later ground to pass a 100 mesh sieve using a RM 100 Retsch mortar grinder (Glenn Mills, Inc. Clifton, N.J.). The residue was stored in a French square bottle and kept in a refrigerator at 4° C. until later analyzed, as described below.

Precipitation of P as phytic acid was accomplished by heating and acidification of the filtrate. In particular, a 10 mL aliquot of the filtrate obtained from each sample was pipetted into a 50 mL plastic centrifuge tube. The contents of each tube was diluted with deionized water and acidified with a salt containing a divalent cation. The centrifuge tube and its contents were incubated in a boiling water bath for 30 minutes during which the phytic acid precipitated. Each sample was then chilled in an ice bath for twenty minutes and later centrifuged in a Jouan C. R 4.22 M4 rotor (Winchester, Va.) for ten minutes at 4500 rpm at 4° C. The supernatant for each sample was separated from the precipitate and stored in a 125 mL LDPE nalgene bottle for later chemical analysis, as described further below.

The various phytic acid precipitate samples were thereafter prepared for analysis by washing. Each precipitate sample was re-suspended in a dilute HCl solution and centrifuged twice. The supernatant was discarded and the precipitate was left to dry under a hood at room temperature. The dried precipitate, referred to as "pellet," was stored in a 15 mL high clarity polypropylene conical centrifuge tube (Becton Dickinson, Franklin Lakes, N.J.), and kept in a refrigerator at 4° C. until later utilized for chemical analysis, as described further below.

Concentration of each filtrate was achieved by taking a 100 mL aliquot of each filtrate and placing it in an evaporating flask of a R-200 Büchi Rotavapor (Flawil, Switzerland). The bath was turned on after the flask was filled to within one inch from the top with deionized water. The bath temperature was set at 100° C. and water-flow through the condenser was set at about 80 L/h. The quick-action jack was used to lower the evaporating flask into the bath so that ⅓ of it was immersed. The distillation was aided by the use of a Büchi v-700 vacuum pump (Flawil, Switzerland) set at 9.1 psi. The distillation was stopped once the filtrate was reduced to about 30% (30-mL of concentrate was left in the evaporating flask). Each concentrate so obtained was thereafter stored in a 15 mL high clarity polypropylene conical centrifuge tube (Becton Dickinson, Franklin Lakes, N.J.) and kept in a refrigerator until later analyzed as described herein.

Unless otherwise specified herein, Applicants measured the pH of the various analytes as reported in the experimental examples below using a glass electrode according to the following procedure. For each pH measurement of a solid analyte, an amount of a solid sample was placed in a French square bottle and deionized water added (obtaining a 1:2.5 solid to water ratio). Each mixture was stirred with a magnetic stirrer for about 10 seconds and left to stand for 15 min. The pH was then measured using a Mettler D12 automated titrator (Mettler-Toledo AG, Columbus, Ohio). For the liquid samples, the electrode of the pH meter was immersed directly into the sample to measure the pH.

Unless otherwise specified herein, Applicants experimental results reported herein are averages of multiple samples expressed on a moisture-free basis after drying for 72 hours at 105° C.

Test 1

The moisture content in original broiler litter and residue samples were determined for sake of comparison using the following procedure. The weight of an empty aluminum weighing dish was recorded on a Brinkmann Sartorius analytical balance (Westbury, N.Y.). Approximately 1 g of the analyte was placed in the weighing dish and the weight recorded. The weighing dish and its contents were placed in an oven (255 G Fisher Isotemp, Fisher Scientific Inc.) and left to dry for forty-eight hours at 105° C. The aluminum dish was then removed from the oven and weighed. The percentage (%) moisture was calculated as follows:

$$\% \text{ moisture} = [(\text{wt}_{moist\ sample}/\text{wt}_{dry\ sample}) - 1] \times 100.$$

The dry-matter content of the filtrate concentrate obtained from each sample was determined as follows. For each sample, the weight of an empty aluminum weighing dish was recorded on the same Brinkmann Sartorius analytical balance, and then an aliquot of ~5.0 g of each concentrate was placed in that dish and the weight recorded to the nearest 0.0001 g. Each dish was thereafter placed in the same oven and left to dry for forty-eight hours at 105° C. Each sample was then removed from the oven, weighed and the percentage (%) moisture was calculated as previously described. The dry-matter content of the concentrate was calculated by subtracting percentage moisture values from 100.

Test 2

Total N and carbon ("C") contents of various analytes were determined using a high combustion CNS Analyzer, Vario EL III (Vario EL III Elemental Analyzer, Hanau, Germany), which analyzer uses high temperature combustion to convert solid or liquid analytes into gaseous forms. Before any analysis, the analyzer was heated and routine maintenance tests performed, and blank samples were introduced into the analyzer for calibration purposes. A 5 mg sample of a sulphanilic acid standard packed in a tin cup was used to calibrate the instrument. For each solid analyte sample, about 20 mg homogenized sample (<0.5 mm) was packed in a tin foil and placed into the carousel of an autosampler. The sample weight was introduced in the analysis window via an on-line balance interfaced with a computer. The gases ($N_2$, $CO_2$, and $SO_2$) were thereafter measured.

Test 3

To determine the total P content in the various test samples, approximately 1 g of a finely ground sample of each solid analyte was weighed out into a 250 mL Erlenmeyer flask. A 30 mL aliquot of perchloric acid (70%) was added to the sample under a hood. Each flask was covered with a Pyrex funnel and digested on a Lindberg/Blue M hotplate (Asheville, N.C.) until heavy white fumes appeared (Temp range of 240-280° C.). The flasks were then removed and allowed to cool. The contents of each flask was repeatedly washed with deionized $H_2O$ and transferred to a 250 mL volumetric flask and the volume was made. The flask was left to stand for several hours for residue deposition at the bottom of the flask.

An aliquot of the supernatant was pipetted into a 25 mL volumetric flask, and drops of 5 M NaOH were added to neutralize the solution using p-nitrophenol as an indicator. Murphy Riley solution (4-mL of $K_2SO_4$ per Murphy et al., *Anal. Chem. Acta.*, 27:31-6, 1962) was added to the flask and the volume was made with deionized $H_2O$. The contents were mixed thoroughly and left to stand for 30 minutes. Three blank samples (only perchloric acid digested) were also prepared. Absorbance of the samples was read at 880 nm using a Du 640 spectrophotometer (Beckman Instruments Inc., Fullerton, Calif.). Known standard concentrations were prepared, the absorbance was read and a standard curve was generated in conventional fashion.

For the liquid samples, 1 mL aliquot of the supernatant or concentrate sample was digested as described above and the volume made up to 250 mL. From the digest, 1 mL aliquot was used for analysis, again using the same spectrophotometer and a calibration curve.

Test 4

Each of the solid samples was also analyzed for water-soluble P ("WSP") and citrate-soluble P ("CSP") according to the following procedures. A 1 g sample (<0.5 mm) of each solid sample was placed on a 9 cm filter paper and washed repeatedly with small portions of deionized water until such time that approximately 250 mL was collected. An aliquot was pipetted and WSP was determined using the heteropoly blue colorimetric method according to the procedure described by Murphy et al. (*Anal. Chem. Acta.*, 27:31-6, 1962). After removal of the water soluble-P, the filter paper and the residue were quickly transferred to a 250 mL flask containing 100 mL aliquot of ammonium citrate solution previously heated to 65° C. The flask was closed tightly and placed in a model 4629 lab-line incubator shaker (Lab-line Instruments Inc, Melrose Park, Ill.) at 65° C. for 1 hour. The flask was removed quickly and filtered by suction as rapidly as possible using Whatman no. 2 filter paper. The residue and filter paper were washed with deionized water heated to 65° C. until the volume of the filtrate was approximately 250 mL. Because citrate interferes with the blue colorimetric method, 10 mL of the filtrate was digested with 5 mL of perchloric acid (70%) to dryness to remove citrate from the sample. The contents of the beaker were washed repeatedly with small volumes of deionized water, into a 25 mL volumetric flask where the CSP was determined using the heteropoly blue colorimetric method.

Test 5

Inorganic P content of the liquid samples produced according to the procedure above was determined colorimetrically using the following procedure. A 1 mL aliquot of the liquid sample was pipetted into a test tube and the sample diluted to 50 mL with deionized water. The test tube was inverted three times to allow proper mixing. A 4 mL aliquot was pipetted into a 25 mL volumetric flask. Inorganic P was determined by the heteropoly blue colorimetric method as described above.

Test 6

Inorganic N analysis was performed on the supernatant and concentrate by steam distillation according to the procedure described by Bremner et al, (*Anal. Chem. Acta.*, 32:215-163, 1965). A 5 mL aliquot of each tested sample was pipetted into the side arm of a distillation flask. For ammonium distillation, approximately 0.2 g of magnesium oxide (MgO) was added and the flask was rapidly connected to the distillation apparatus. The distillate was collected into a LDPE plastic cup containing 5 mL of boric-acid indicator solution ($H_3BO_3$). The distillation was stopped when the distillate was about 35 mL, and the tip of the condenser rinsed with deionized water. For nitrate+nitrite distillation, the side arm of the flask was opened and approximately 0.2 g of Devarda's alloy was quickly added to the flask contents and the distillation continued. The distillate was collected into another LDPE cup containing 5 mL of boric-acid indicator solution ($H_3BO_3$).

Thereafter, ammonium-N and ($NO_3^-$—N+$NO_2^-$—N) contents were determined following titration of the filtrate with a standardized $H_2SO_4$ solution using a Mettler DL12 Titrator (Mettler-Toledo AG, Columbus, Ohio).

The results from Tests 1-6 are reported in FIG. 2 through FIG. 14.

Figure 2:
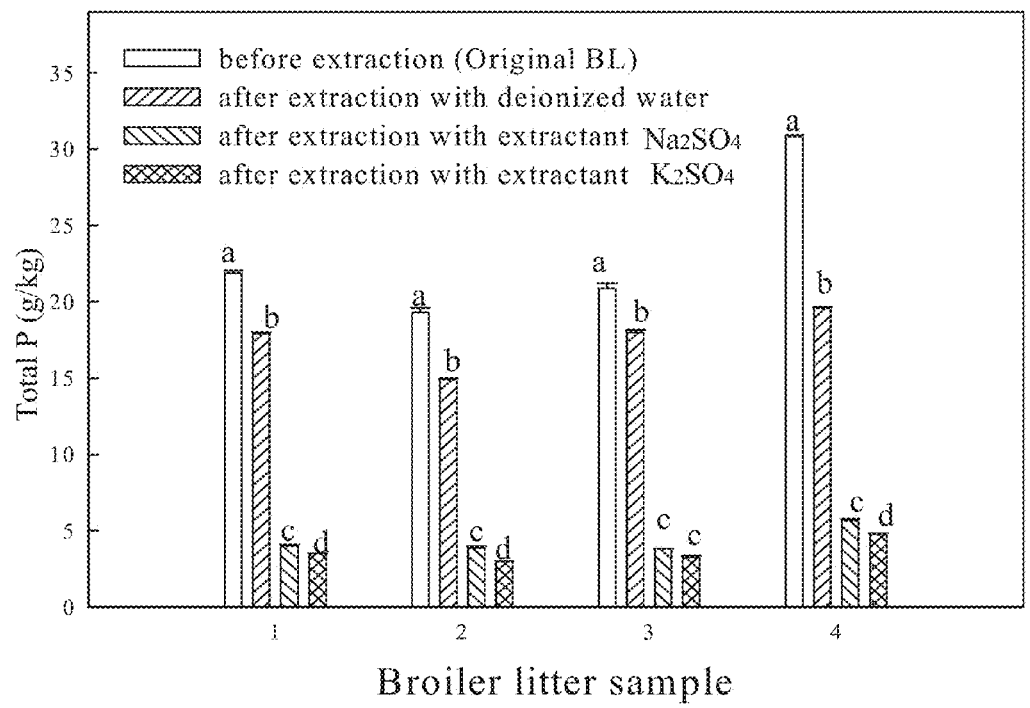
FIG. 2 is a bar graph that reports the average total phosphorus content of broiler litter samples before and after extraction obtained in the various experiments as described herein.

Most importantly, the results on the success of the two extractant solutions according to the present invention, relative to deionized water, in P removal from the original broiler litter are presented in FIG. 2, which graphically reports the average total phosphorus content of broiler litter samples before and after extraction obtained in the above experimental procedure. In FIG. 2, the letters (a, b, and c) above the various bar columns for each broiler litter sample identify groupings of means that are significant (at $p<0.05$). As clearly shown in FIG. 2, the total P in the residues of the treated four broiler litter samples varied with the extracting solutions, with $K_2SO_4$ performing slightly (but statistically insignificantly) better than $Na_2SO_4$ as an extracting agent, and both of Applicants' extractant solutions performed better than deionized water.

The total P content of the original broiler litter varied from 19.3 g/kg in sample no. 2 to 30.8 g/kg in sample no. 4. The P content of the broiler litter residues obtained following extractions of the original broiler litter samples showed that the various extractants removed significant amounts of P from all of the samples. Under 5 g/kg of P remained in the residues of broiler litter sample nos. 1-3 using either of Applicants' extractants. A higher amount remained in both residues of broiler litter sample no. 4, but that original broiler litter contained a much higher initial amount of P. The total P remaining in the residues averages across the four broiler litter samples studied ranged from 17.6 g/kg (using deionized water as the extractant) to 4.35 g/kg for $Na_2SO_4$ and 3.64 g/kg for $K_2SO_4$. The average percentage P removed was 84.3, 81.3 and 21.1% by $Na_2SO_4$, $K_2SO_4$, and deionized water respectively. Thus, Applicants method reduced total P in the broiler litter by between 18 and 19 g/kg.

The various forms of P in the original broiler litter samples and in the treated residues after extraction are presented in the table depicted in FIG. 3. As shown in that table, on average plant available P, which includes WSP and CSP, was about 38% before extraction while the water-soluble P represented 97% of the plant available P. Extraction of original broiler litter samples with deionized water had a significant effect on forms of P remaining in the broiler litter residues. However, citrate insoluble P still remained the most significant fraction of P in the residues. An ANOVA analysis showed that treatment and broiler litter interaction was significant. A high quantity of WSP was observed in residues extracted with water, while residues obtained from the $Na_2SO_4$ and $K_2SO_4$ extractant solutions were about three times lower. As shown, the mean WSP values were 6.09 g/kg, 2.21 g/kg, and 2.29 g/kg for deionized water, $Na_2SO_4$ extractant solution, and $K_2SO_4$ extractant solution, respectively. Further, the average percentages of plant available P remaining in the residues following extraction with deionized water, $Na_2SO_4$ extractant solution, or $K_2SO_4$ extractant solution were 64.4, 43.4 and 30.3%, respectively.

The table of FIG. 3 also reports the amounts of citrate insoluble P ("CISP") in the various litters and residues. As shown therein, the average % of (CISP) remaining after extraction with deionized water, $Na_2SO_4$ extractant solution, or $K_2SO_4$ extractant solution were 62.5, 43.7, and 31%, respectively. Extractants $Na_2SO_4$ and $K_2SO_4$ effectively removed significant portions of all P fractions in the broiler litter samples studied. Thus P in the residues was less likely to impact negatively the environment when applied to cropland or pastureland.

Figure 4A:
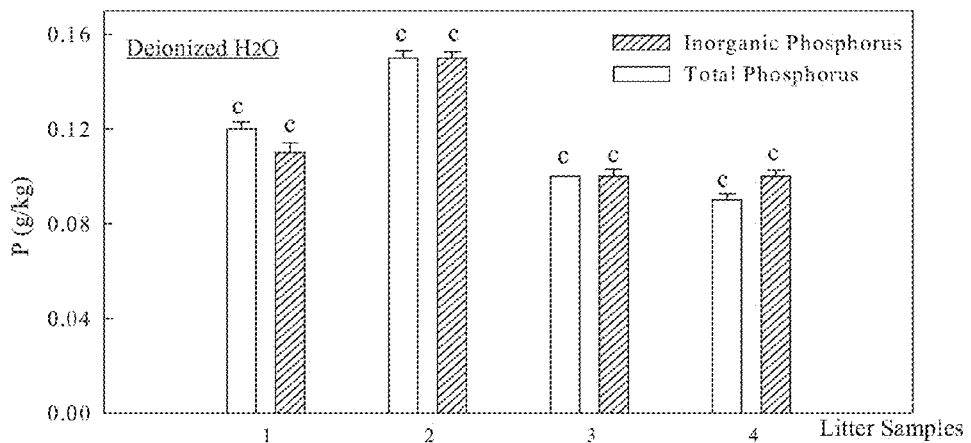
FIG. 4A through FIG. 4C are bar graphs that report the average experimental measurements for the phosphorus content of various supernatants obtained in certain experiments as described herein.
Figure 4B:
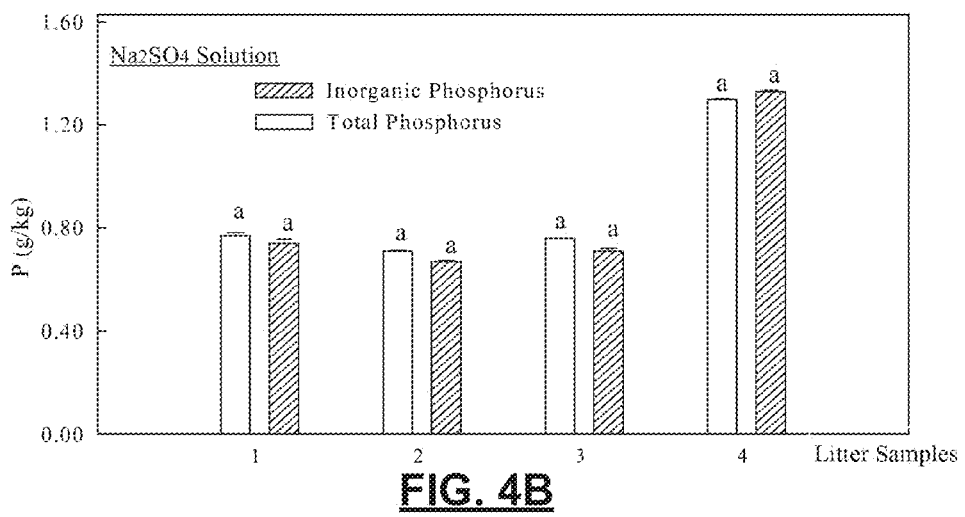
Figure 4C:
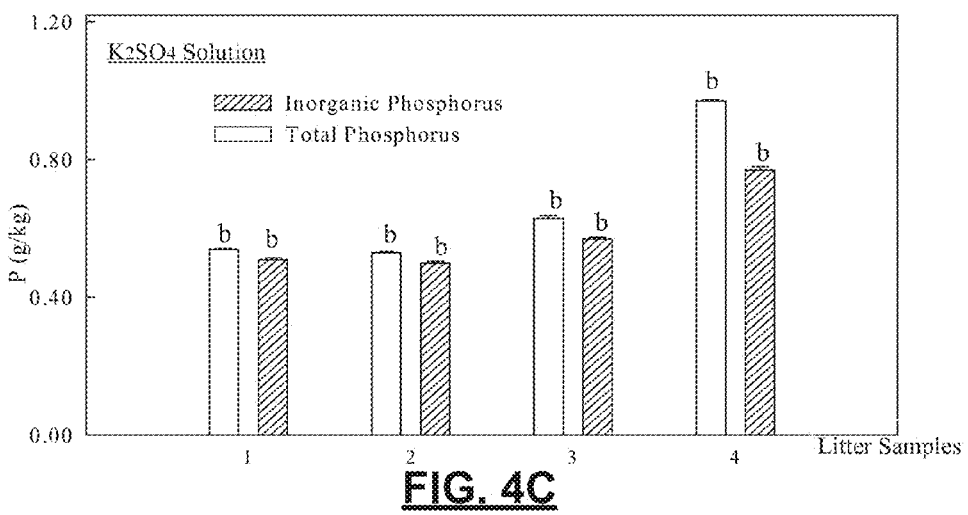
Figure 6:
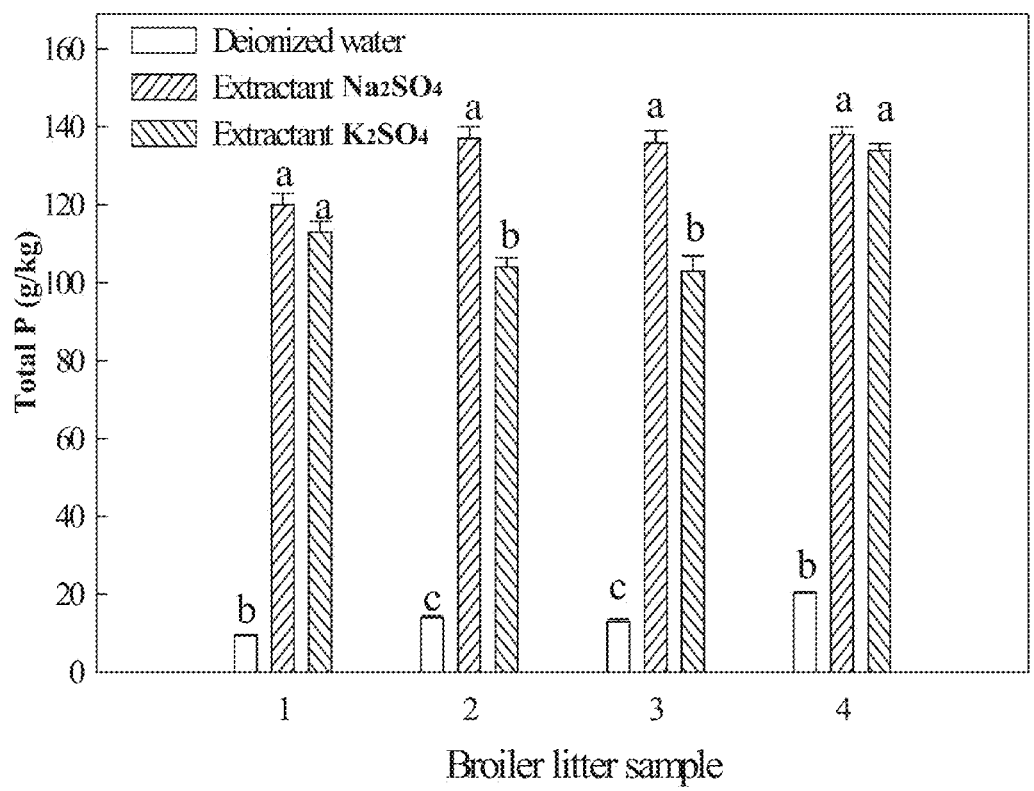
FIG. 6 is a bar graph that reports experimental data regarding the P content for the pellet samples for various experiments described herein.

FIG. 4A through FIG. 4C comprise three bar graphs depicting the experimental measurements for the phosphorus content of the various supernatants. In those figures, the total and inorganic phosphorus released in supernatant of broiler litter samples equilibrated with deionized water (FIG. 4A), $Na_2SO_4$ extractant solution (FIG. 4B), or $K_2SO_4$ extractant solution (FIG. 4C) is reported, and the lowercase letters above the various bar columns for each broiler litter sample identify groupings of means by total and inorganic P that are significant (at $p<0.05$). As can be seen by comparison of these three graphs, within the margins of errors total P and inorganic P contents of the supernatants obtained by deionized water, $Na_2SO_4$ extractant solution, and $K_2SO_4$ extractant solution were similar. This indicates that there was essentially no organic P present in the supernatants. On an average, the total P content of supernatant from $Na_2SO_4$ extraction (0.89 g/kg) and $K_2SO_4$ extraction (0.86 g/kg) were higher than that of from deionized water extraction (0.08 g/kg). This low P concentration observed in the supernatant following precipitation of phytic acid-P suggests that virtually all the organic P present in the filtrate was effectively precipitated by the method developed.

Given these results, an estimated total phytic acid content of the samples tested is shown in the table provided as FIG. 5. As reported therein, high amounts of total P remained in broiler litter residues extracted with water (17.6 g/kg), therefore only a small portion of the total P remained in the supernatant (Table 4 and FIG. 10). Table 4 showed that only small amounts of total P remained in the residues (on average 4.35 and 3.64 g/kg for $Na_2SO_4$ extractant solution and $K_2SO_4$ extractant solution, respectively) and therefore smaller amounts were found in the supernatants (0.89 and 0.67 g/kg for $Na_2SO_4$ extractant solution and $K_2SO_4$ extractant solution, respectively). Thus, the P not recovered in the residues and supernatants was precipitated by the extractants. The estimated phytic acid-P contents of $Na_2SO_4$ extractant solution and $K_2SO_4$ extractant solution were on an average 18.0 (77%) and 18.9 g/kg (81.4%) litter, respectively.

The precipitated pellet samples were analyzed and were found to be extremely rich in P. Pellets obtained from $Na_2SO_4$ extractant solution and $K_2SO_4$ extractant solution filtrates had significantly higher total P contents than those obtained from the deionized water filtrate. The data regarding P content for the pellet samples for the various experiments are reported in the bar graph of FIG. 6. Total P values of pellets of $Na_2SO_4$ extractant solution and $K_2SO_4$ extractant solution were approximately 10 to 11 times higher than that of the pellet obtained from the deionized water filtrate. Although the P content of the pellets obtained from $Na_2SO_4$ extractant solution and $K_2SO_4$ extractant solution were above 100 g/kg, there were some considerable differences. While P values obtained for pellets obtained from $Na_2SO_4$ extractant solution for samples nos. 2 and 3 were higher and significantly different ($p\leq0.05$) from those obtained for pellets of $K_2SO_4$ extractant solution for the corresponding litter samples, no significant difference was observed for sample nos. 1 and 4.

Figure 7A:
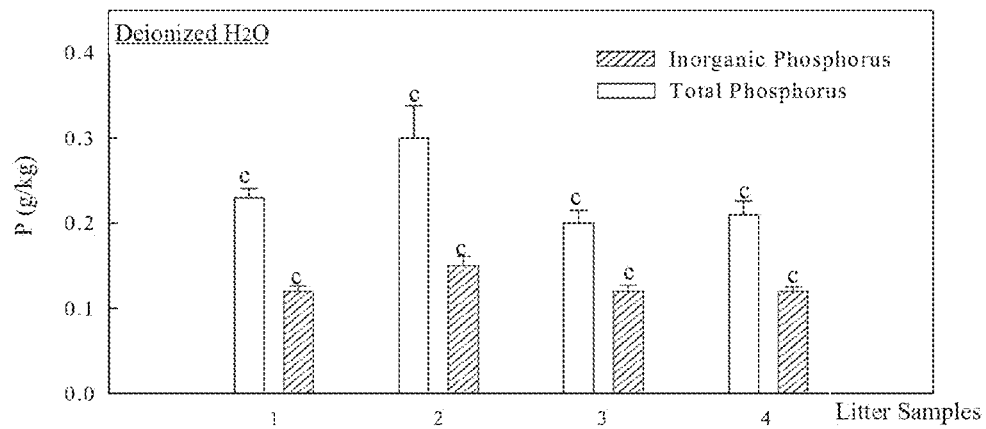
FIG. 7A through FIG. 7C are bar graphs that report the average experimental measurements for the phosphorus content of various concentrated filtrates obtained in certain experiments as described herein.
Figure 7B:
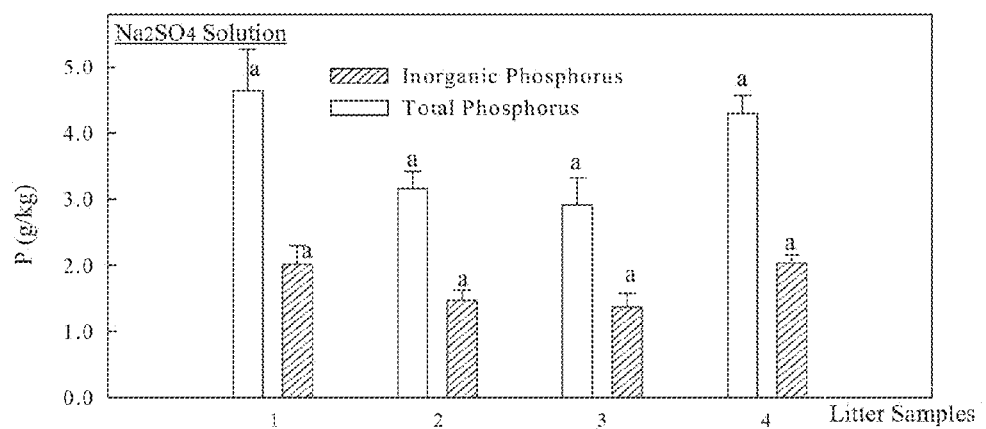
Figure 7C:
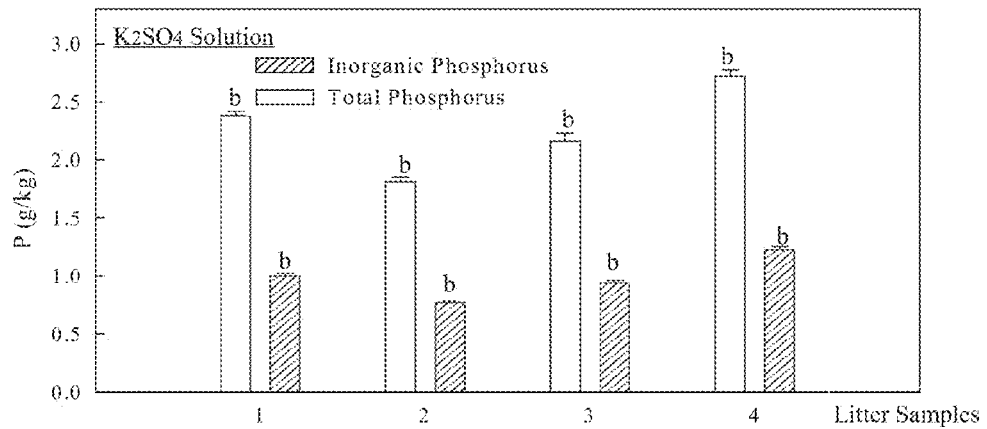

Applicants' measurements regarding the P content of the concentrated filtrate is reported in the bar graphs of FIG. 7A through 7C, and these measures produced similar trends to that of the supernatants, as reported above in FIG. 4A through FIG. 4C. Concentrated filtrate total P was highest for the original broiler litter samples that were extracted with $Na_2SO_4$ extractant solution, thus were significantly different ($p\leq0.05$) from those extracted with $K_2SO_4$ extractant solution. While original broiler litter samples extracted with $Na_2SO_4$ extractant solution and $K_2SO_4$ extractant solution had mean total P values of 3.76 and 2.27 g/kg, respectively, water extracted samples showed a mere 0.24 g/kg. Unlike the supernatants, there was a marked difference between the total and inorganic phosphorus for all the extractants. Inorganic P measured was approximately 40 to 50% of the total phosphorus. Broiler litter nos. 1 and 4 had the highest total P values for both of Applicants' extracting solutions.

The results of carbon, nitrogen, and sulfur characterization of the original broiler pitter, and the various by-products produced by the experimental methods outlined above are presented in the table of FIG. 8B. As shown, broiler litter nitrogen (N) ranged between 35.0 and 43.1 g/kg, and total N in all of the samples studied were significantly different ($p\leq0.05$) from each other. Although organic carbon (C) values were above 300 g/kg and varied considerably, the majority were not statistically different from each other. Broiler litter samples 1, 2 and 3 each with over 350 g/kg of organic carbon present were not statistically different from each other, but they were all different from sample no. 4. The sulfur (S) content of the samples studied was very low compared to the two other elements, and ranged between 6.05 and 8.19 g/kg. These results are non-surprising given the different makeup of the four different original poultry litter samples utilized as base materials for the experiments (see FIG. 8A).

The average total organic N content of the broiler litter before extraction was 39.4 g/kg. After extraction with deionized water, the total organic N content decreased to 25.3 g/kg in the residue while it decreased to 22.2 and 20.2 g/kg following extraction with $Na_2SO_4$ extractant solution and $K_2SO_4$ extraction solution, respectively, corresponding to 64.2% of total N remaining following extraction with water, and 56.3% following $Na_2SO_4$ extraction, and 51.3% following extraction with $K_2SO_4$. This indicates that an important fraction of total N remained in the broiler litter samples, unlike P. In sum, P was selectively removed by the extracting solutions while the amount of N removed by the extractants was not significant.

Prior attempts to utilize addition of chemicals to animal waste has led to a reduction in N levels in manure, which renders the manure less suitable for crop fertilizing purposes. For example, alum has been reported to reduce N levels by 20% in swine lagoons while reducing P levels by 75% (see Worley et al., *Applied Eng. in Agr.*, 16:551-561, 2000). The high N content of the residue is very important if the residue is to remain suitable for application as a soil amendment.

As shown in FIG. 8B, the organic carbon content of the residue remained also considerably high. On average the organic C remaining in the residue after extraction with deionized water was 94.5% and that remaining after extraction with $Na_2SO_4$ and $K_2SO_4$ was 79.8 and 70.1%, respectively. These results suggest again that the value of the residue as soil amendment remains relatively high.

On average, about 47.9% of organic S present in the broiler litter samples remained in the residue after extraction with deionized water, per FIG. 8B. The S content of the residue samples following extraction with $Na_2SO_4$ extractant solution and $K_2SO_4$ extractant solution was significantly higher than that of the original broiler litter sample because S is a component of the extractants developed. Thus, the broiler litter residues produced in embodiments of the present invention may prove especially suitable for use as a soil amendment in soils deficient in S or for crops that thrive with higher S concentrations.

Unlike the residue, organic C in the supernatant was extremely low, as shown in the table provided as FIG. 9. The mean values for the deionized water, $Na_2SO_4$, and $K_2SO_4$ treatments were 1.10, 1.15 and 1.06 g/kg, respectively. Generally, compared to the residues, organic C values were very low, suggesting that the present methods do not leach organic C from the broiler litter.

Organic N contents of the supernatants were relatively higher than the organic C content of supernatants and showed greater contrast in the treatments applied. Supernatants obtained using $K_2SO^4$ extractant solution had the highest organic N values and were significantly different ($p \leq 0.05$) from the two other treatments. Surprisingly, organic N amounts extracted by deionized water were significantly higher than for $Na_2SO_4$.

The organic S content as expected displayed a similar trend, as did the residues. Organic S content of the supernatant means extracted using solutions $Na_2SO_4$ or $K_2SO_4$ were 8.3 and 8.15 g/kg, respectively, while the deionized water extracted supernatant averaged 0.61 g/kg. Generally, samples no. 3 and 4 were higher than samples 1 and 2, as shown in FIG. 9.

Total C, N, and S contents of the concentrates are presented in the table of FIG. 10. The experimental results showed that total organic carbon in the concentrate were about five times greater than that present in the supernatants. Organic C values were significantly different ($p \leq 0.05$) due to the treatment applied and displayed a similar pattern to that of the residue. On an average, the concentrate obtained from deionized water extraction had a mean of 7.65 g/kg and was significantly different ($P \leq 0.05$) from the means of concentrates obtained from $Na_2SO_4$ extractant solution or $K_2SO_4$ extractant solution. The mean values obtained were 6.52 g/kg and 5.15 g/kg for concentrates from $Na_2SO_4$ extractant solution and $K_2SO_4$ extractant solution, respectively.

Although total N means of the treatments ranged from 4.02 to 4.66 g/kg, concentrates obtained from deionized water and $Na_2SO_4$ extractant solution were not significantly different. However, they were both higher than and significantly different from $K_2SO_4$ extractant solution concentrate. Broiler litter concentrates of sample no. 1, 2, and 3 were higher than for sample no. 4.

Total S content of concentrate filtrate means obtained using the solutions of $Na_2SO_4$ and $K_2SO_4$ was 38.7 and 16.4 g/kg, respectively, while mean average S content obtained from deionized water extractant was merely 0.83 g/kg. Statistical analysis showed that there were no significant differences among the broiler litter sample concentrates obtained from deionized water, $Na_2SO_4$ extractant solution, or $K_2SO_4$ extractant solution.

Results of total C, N, and S of the concentrated filtrate are presented in the table of FIG. 11. It should be noted that for the deionized water extracted filtrate, no pellet was formed. This may suggest that no phytic acid-P was present. The results showed that total organic C in the pellets varied between 54.9 and 146 g/kg for $Na_2SO_4$ extractant solution and between 60.4 and 70.4 g/kg for $K_2SO_4$ extractant solution. The statistical analysis showed the means of 93.5 g/kg (for $Na_2SO_4$ extractant solution) and of 65.5 g/kg (for $K_2SO_4$ extractant solution) were significantly different ($p \leq 0.05$).

Unlike the supernatants, total N contents of pellets were much lower than organic C contents. Although pellets obtained with $K_2SO_4$ extractant solution showed a significant difference ($p \leq 0.05$) in comparison with those obtained from $Na_2SO_4$ extractant solution. Also, sample no. 2 was significantly higher for $Na_2SO_4$ extractant solution than $K_2SO_4$ extractant solution, as shown in the table. Even though there was a large variation in total N of individual broiler litter samples, pellets obtained from $Na_2SO_4$ extractant solution, the mean and the median values are very close (5.33 g/kg for the mean and 5.29 g/kg for the median) suggesting that the samples were well distributed. The sulfur content of the pellets varied significantly ($p \leq 0.05$) for individual samples within a specific extractant. While pellet sample no. 4 of both $Na_2SO_4$ and $K_2SO_4$ extractant solutions have an equal S content of 20.4 g/kg, pellet sample no. 2 showed significantly different S contents for $Na_2SO_4$ extractant solution (68.7 g/kg) and for $K_2SO_4$ extractant solution (20.3 g/kg). On an average, the S content of sample pellets from $Na_2SO_4$ extractant solution was 40.9 g/kg and 18.8 g/kg for those of $K_2SO_4$ extractant solution.

Inorganic nitrogen in the solid analytes was measured by steam distillation using the method as previously described by Bremner et al. (*Anal. Chem. Acta.*, 32:215-163, 1965). In general, the $NH_4^+$ (ammonium) form N concentrations of the original and residue broiler litter samples varied based on the extractants used. Applicants' data also showed that there was a significant reduction in both $NH_4^+$ form N and ($NO_3^-$ and $NO_2^-$, or collectively "$NO_x$") form N after extraction with deionized water, $Na_2SO_4$ extractant solution or $K_2SO_4$ extractant solution.

However, samples extracted with $Na_2SO_4$ extractant solution, had the highest values of either of the nitrogen forms. The differences observed among the extractants could be attributed to differences in their abilities to complex with various nitrogenous compounds in the samples. Mean $NH_4^+$ form N concentrations for the residues extracted with deionized water, $Na_2SO_4$ extractant solution or $K_2SO_4$ extractant solution were 0.43, 0.75 and 0.26 g/kg, respectively, as reported in the table of FIG. 12. Ammonium N concentrations of sample no. 1 and 4 obtained from deionized water and $Na_2SO_4$ extractant solution residues were higher than for samples no. 2 and 3. This was a similar trend observed in the original broiler samples. Sample no. 4 and 1 with $NH_4^+$ N concentrations of 2.87 and 2.70 g/kg were higher than for samples no. 2 and 3, as shown in FIG. 12.

Inorganic N contents of the filtrates are likewise presented in the table of FIG. 13. Applicants experiment results indicated that most of the inorganic N present in the broiler samples was removed by the extractants. For the deionized water extraction, $NH_4^+$ form N concentrations in the filtrates were on average 2.14 g/kg (83.3% of $NH_4^+$ form N of the original broiler litter), while $NO_x$ concentration was 1.78 g/kg (98.0% of the amount present in the original broiler litter). Ammonium N content of the broiler litter filtrates from extractants $Na_2SO_4$ and $K_2SO_4$ were, respectively, 70.8% and 89.9% of $NH_4^+$ form N originally present. The $NO_x$ form N of the filtrates represented 86.7 and 92.3% of the original level in the broiler litter samples, and generally, the ammonium form N remained the most dominant inorganic N form in the filtrates, as shown in FIG. 13.

Supernatant inorganic N contents are presented in table of FIG. 14. The inorganic N present in the supernatants was higher than for the filtrates, as can be seen by comparison of FIG. 14 with FIG. 13. Applicants deduce that the main reason for this difference is that the filtrate before precipitation of the phytic acid was incubated in boiling water for 30 minutes, during which part of the organic N present in the filtrate mineralized. Ammonium N contents were highest among all of the by-products obtained after extraction with the various extractants. Although the $NH_4^+$ form N concentrations of the supernatants varied irrespective of extractants, supernatants obtained from deionized water and $Na_2SO_4$ extractant solution filtrates showed no significant difference ($p \leq 0.05$) with means of 3.49 and 3.47 g/kg. Ammonium form N concentrations of water-extracted supernatants varied from 2.80 to 5.04 g/kg. $K_2SO_4$ supernatants ranged from 1.80 to 3.87 g/kg. Sample no. 4 had the highest ammonium form N concentrations for all of the extractants while sample no. 3 showed the least $NH_4^+$ form N content for $K_2SO_4$ extractant solution supernatants. Further, sample no. 1 had an $NH_4^+$ form N concentration of 1.80 g/kg, as shown. Experimental conditions were not conclusive for $NH_4^+$ form N conversion into $NO_x$ form N with the exception of broiler litter sample no. 3, and ammonium appeared to be the most dominant inorganic fraction of the supernatant.

Applicants' results for the inorganic N content of the various concentrates is depicted by the table of FIG. 15. Applicants' experimental purpose in concentrating the various filtrates was to confirm the ability to obtain a liquid sample more concentrated in mineral nutrients. However, it appeared that the concentrates have inorganic N contents that were significantly lower than those of the filtrates. Reduction in inorganic N following rotavapor concentration of the filtration could be attributed to the high water bath temperature (100° C.) that accelerated N volatilization from the evaporating flask.

The methods described above produced satisfactory results with both extractant solutions. Thus the primary objective of the research was achieved. No major differences in the effectiveness of the extractants were noticed; however because one of the components of the $Na_2SO_4$ extractant solution is sodium, it may be unwise to propose $Na_2SO_4$ extractant solution for large scale use alone over long periods of time for fear to load soils with sodium, which can have a negative effect on soil structure.

The experiment results summarized above indicate that one potentially may apply five times more than the recommended broiler litter application rates for cropland and pastureland without overloading soils with P. The implications of this technology to one of ordinary skill in the art are significant because it offers farmers the opportunity to reduce P content of broiler litter in order to meet animal waste disposal standards, protect the environment from excessive P loading, reduce eutrophication of surface waters, and generate additional income by selling the concentrate obtained as a liquid fertilizer for indoor plants and the pellet as a plant food for gardeners.

Having described preferred embodiments of the invention, it will now become apparent to those of ordinary skill in the art that other embodiments incorporating these concepts may be used. Accordingly, it is submitted that that the invention should not be limited to the described embodiments but rather should be limited only by the spirit and scope of the appended claims.

Thus, although the invention has been described and illustrated with a certain degree of particularity, it is understood that the present disclosure has been made only by way of example, and that numerous changes in the combination and arrangement of steps, ingredients, or processes can be resorted to by those skilled in the art without departing from the spirit and scope of the invention, as will be claimed hereafter.

The invention claimed is:

1. A method for removing excess phosphorous from a poultry litter rich in phosphorous content, said method comprising the steps of:
    preparing an extractant solution containing a suitable amount of at least one extractant agent selected from the group consisting of $Na_2SO_4$ and $K_2SO_4$;
    contacting an amount of said poultry litter with the extractant solution;
    leaving said amount of poultry litter in contact with said extractant solution for an amount of time sufficient to allow a desired amount of phosphorous to be removed from said poultry litter; and
    separating said amount of poultry litter and said extractant solution to obtain phosphorous-depleted poultry litter.

2. The method according to claim 1, wherein said phosphorous-depleted poultry litter has no more than 50% of the amount of phosphorous in said poultry litter prior to said contacting step.

3. The method according to claim 2, wherein said phosphorous-depleted poultry litter has no more than 70% of the amount of phosphorous in said poultry litter prior to said contacting step.

4. The method according to claim 3, wherein said phosphorous-depleted poultry litter has no more than 80% of the amount of phosphorous in said poultry litter prior to said contacting step.

5. The method according to claim 1, wherein said extractant solution contains at least 2.5% of said extractant agent.

6. The method according to claim 5, wherein said extractant solution contains at least 5% of said extractant agent.

7. The method according to claim 6, wherein said extractant solution contains at least 10% of said extractant agent.

8. The method according to claim 1, wherein said contacting step comprises immersing said poultry litter in said extractant solution.

9. The method according to claim 8, wherein said contacting step further comprises agitating a mixture of poultry litter immersed in said extractant solution.

10. The method according to claim 1, further comprising drying said phosphorous-depleted poultry litter.

11. The method according to claim 1, further comprising recovering removed phosphorous from said poultry litter.

12. The method according to claim 11, wherein said recovering is achieved by precipitating a phosphorous solid from liquid filtrate obtained from said separating step.

13. The method according to claim 1, wherein said separating step is accomplished by one or more methodologies selected from the group consisting of filtering, sieving, sifting, centrifugation, and sedimentation.

14. The method according to claim 1, wherein said contacting, said leaving, and said separating steps are performed twice, a first time for a first extractant agent, and a second time for a second extractant agent.

15. A method for disposing of poultry litter rich in phosphorous content, said method comprising removing a desired amount of phosphorous from an amount of said phosphorous-rich poultry litter utilizing the method according to claim 1, and mixing said phosphorous-depleted poultry litter obtained with crop soil.

16. The method of claim 14, further comprising physically processing said phosphorous-depleted poultry litter prior to mixing with said crop soil.

17. The method of claim 14, wherein said physically processing comprises milling or grinding said phosphorous-depleted poultry litter to obtain a desired consistency.

18. The method according to claim 15, further comprising drying said phosphorous-depleted poultry litter prior to mixing with said crop soil.

19. The method according to claim 15, further comprising recovering removed phosphorous from said poultry litter by precipitating a phosphorous solid from liquid filtrate obtained from said separating step.

20. A method for augmenting crop soil, comprising mixing crop soil with a phosphorous-depleted poultry litter obtained from the method according to claim 1.

* * * * *